US008942861B2

(12) United States Patent
Wakao

(10) Patent No.: US 8,942,861 B2
(45) Date of Patent: Jan. 27, 2015

(54) ROAD SURFACE CONDITION ESTIMATION METHOD, AND ROAD SURFACE CONDITION ESTIMATION APPARATUS

(75) Inventor: Yasumichi Wakao, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/233,223

(22) PCT Filed: Jul. 18, 2012

(86) PCT No.: PCT/US2012/068154
§ 371 (c)(1),
(2), (4) Date: Feb. 12, 2014

(87) PCT Pub. No.: WO2013/011992
PCT Pub. Date: Jan. 24, 2013

(65) Prior Publication Data
US 2014/0163770 A1    Jun. 12, 2014

(30) Foreign Application Priority Data

Jul. 26, 2011 (JP) ................................. 2011-158854
Jul. 26, 2011 (JP) ................................. 2011-162676

(51) Int. Cl.
*B60W 40/068* (2012.01)
*B60T 8/172* (2006.01)

(52) U.S. Cl.
CPC .............. *B60W 40/068* (2013.01); *B60T 8/172* (2013.01); *B60W 2520/28* (2013.01); *B60W 2510/227* (2013.01); *B60T 2210/12* (2013.01)
USPC .............................................. 701/1; 303/121

(58) Field of Classification Search
USPC .................. 701/1, 80, 78, 81, 83; 303/121
See application file for complete search history.

(56) References Cited

U.S. PATENT DOCUMENTS

| 4,893,239 A * | 1/1990 | Eto et al. ........................ 701/1 |
| 6,266,602 B1 * | 7/2001 | Yamaura ...................... 701/80 |
| 2001/0029421 A1 | 10/2001 | Watanabe et al. |

FOREIGN PATENT DOCUMENTS

| JP | 8-15069 A | 1/1996 |
| JP | 3186474 A | 7/2001 |
| JP | 2001-247027 A | 9/2001 |

(Continued)

OTHER PUBLICATIONS

English translation of International Preliminary Report on Patentability for PCT/JP2012/068154 dated Jan. 21, 2014.

(Continued)

*Primary Examiner* — Marthe Marc-Coleman
(74) *Attorney, Agent, or Firm* — Sughrue Mion, PLLC

(57) ABSTRACT

The invention provides a method and apparatus capable of accurately estimating a road surface condition under a traveling vehicle using unsprung acceleration and wheel speed data. The unsprung fore-aft acceleration (Gx) is detected by an acceleration sensor (11) attached to a knuckle (31) which is an unsprung component of a vehicle. At the same time, the wheel speed (Vw) is detected and the variation ($\Delta$Vw) in wheel speed is calculated. Then the fluctuation range ($\sigma(\Delta Vw)$) of the variation in wheel speed and the fluctuation range ($\sigma(Gx)$) of the unsprung fore-aft acceleration are calculated. And whether the road surface is a rough road surface with some bumpiness or a flat (smooth) road surface is estimated from a relationship between the fluctuation range ($\sigma(\Delta Vw)$) of the variation in wheel speed and the fluctuation range ($\sigma(Gx)$) of the unsprung fore-aft acceleration.

11 Claims, 8 Drawing Sheets

(56) References Cited

FOREIGN PATENT DOCUMENTS

| JP | 2001-287634 A | 10/2001 |
| JP | 2004-042821 A | 2/2004 |
| JP | 2008-179261 A | 8/2008 |
| JP | 2010-274906 A | 12/2010 |

OTHER PUBLICATIONS

International Search Report for PCT/JP2012/068154 dated Aug. 14, 2012.

* cited by examiner

ROAD SURFACE CONDITION ESTIMATION METHOD, AND ROAD SURFACE CONDITION ESTIMATION APPARATUS

CROSS REFERENCE TO RELATED APPLICATIONS

This application is a National Stage of International Application No. PCT/JP2012/068154 filed Jul. 18, 2012, claiming priority based on Japanese Patent Application Nos. 2011-158854 filed Jul. 20, 2011 and 2011-162676 dated Jul. 26, 2011, the contents of all of which are incorporated herein by reference in their entirety.

BACKGROUND OF THE INVENTION

1. Field of the Invention

The present invention relates to a method and apparatus for estimating a road surface condition under a traveling vehicle.

2. Description of the Related Art

To enhance the travel stability of a vehicle, it is desired that the road surface condition or the ground contact state of the tire is estimated with accuracy and the data thus obtained is fed back to vehicle control. If the road surface condition or the ground contact state of the tire can be estimated in time, then it will be possible to operate such advanced control as ABS (antilock braking system) braking before taking any danger avoidance action such as braking, accelerating, or steering. With such facility, there will be a marked boost in the safety of vehicular operation.

There are a number of proposed methods for estimating a road surface condition. In one of such methods (see Patent Document 1, for instance), a tire used for the estimation of road surface conditions has deformable structural areas, each including sipes, formed at a specific pitch P circumferentially in the shoulder region of the tire. And the vibrations of the running tire tread are detected by an acceleration sensor to acquire a vibration spectrum, and at the same time the wheel speed is measured by a wheel speed sensor. Then the road surface condition is estimated from the vibration level caused by the deformable structural areas at the detected frequency calculated from the wheel speed measured by the wheel speed sensor and the pitch P.

Also, there are methods proposed for estimating the road-hugging performance of a wheel, using a kinetic state quantity of the wheel (see Patent Document 2, for instance). As described in Patent Document 2, an FFT analysis is performed on the vibration components in the unsprung resonant frequency range extracted from a wheel speed. Then the maximum value $G_v$ of gain of the obtained frequency component in the analysis is compared with the predetermined reference value $G_{v0}$. And if the maximum value $G_v$ of gain is greater than the reference value $G_{v0}$, the road-hugging performance is determined to be poor, and if the maximum. value $G_v$ of gain is smaller than the reference value $G_{v0}$, the road-hugging performance is determined to be satisfactory.

Also, there are various road surface shape detecting apparatuses disclosed. In one of them (see Patent Document 3, for instance), the vibrations of unsprung parts of a vehicle when the vehicle goes over a road surface bump are detected by acceleration sensors attached to the unsprung parts of the right and left wheels. At the same time, the difference $A_{p-p}$ between the maximum value and the minimum value of the unsprung vibrations is calculated. Then the road surface bump height $X_1$ and the road surface bump width $X_2$ are estimated using the difference $A_{p-p}$ between the maximum value and the minimum value and a multiple regression equation representing a predetermined relationship between the road surface bump height $X_1$ and road surface bump width $X_2$ and the difference $A_{p-p}$ between the maximum value and the minimum value. Note here that the multiple regression equation is determined for each of wheel speeds.

PRIOR ART DOCUMENT

Patent Document

Patent Document 1: Japanese Unexamined Patent Application Publication No. 2010-274906
Patent Document 2: Japanese Unexamined Patent Application Publication No. 8-15069
Patent Document 3: Japanese Patent No. 3186474

SUMMARY OF THE INVENTION

Problem to be Solved by the Invention

However, the method using a tire dedicated to the estimation of a road surface condition poses a problem that tread pattern design is subject to reduced freedom because of certain limitations on the tread pattern.

Also, the method for estimating the road-hugging performance of a wheel by use of a kinetic state quantity of the wheel relies on the wheel speed only that is used actually as the kinetic state quantity of the wheel. As a result, tire or suspension data must be added if a road surface condition is to be estimated with accuracy.

Also, the method for detecting vehicular unsprung vibration uses the unsprung resonance of about 11 to 12 Hz that occurs when the vehicle goes over a road surface bump. Therefore, while it is possible to estimate the shape of a transient road surface bump, it is difficult to estimate the road surface properties related to its slipperiness.

The present invention has been made in view of the above-described problems, and an object thereof is to provide a method and apparatus for accurately estimating a road surface condition under a traveling vehicle using unsprung fore-aft acceleration and wheel speed data.

Means for Solving the Problem

Through a systematic and exhaustive investigation, the inventor has reached the present invention based on the following findings: The variation $\Delta V_w$ in wheel speed $V_W$ and the unsprung fore-aft acceleration $G_x$ are in proportional relationship with each other. And the relationship between the fluctuation range $\sigma(\Delta V_w)$ of the variation $\Delta V_w$ in wheel speed $V_w$ and the fluctuation range $\sigma(G_x)$ of the unsprung fore-aft acceleration $G_x$ depends on road surface conditions, particularly, the fluctuation range $\sigma(g)$ of vibration g due to the roughness (bumpiness) of the road surface. Therefore, the road surface condition under a traveling vehicle can be estimated with accuracy by detecting the wheel speed $V_w$ and the unsprung fore-aft acceleration $G_x$ and finding a relationship between the value of the fluctuation range $\sigma(\Delta V_w)$ of the variation $\Delta V_w$ in wheel speed $V_w$ and the value of the fluctuation range $\sigma(G_x)$ of the unsprung fore-aft acceleration $G_x$.

Accordingly, the present invention provides a method which includes the steps of detecting an unsprung fore-aft acceleration $G_x$ by an acceleration sensor attached to an unsprung position of a vehicle, detecting a wheel speed $V_w$, calculating a variation $\Delta V_w$ in the detected wheel speed, calculating a fluctuation range $\sigma(\Delta V_w)$ of the calculated variation in wheel speed and a fluctuation range $\sigma(G_x)$ of the detected unsprung fore-aft acceleration, and estimating a road surface condition from a relationship between the fluctuation range $\sigma(\Delta V_w)$ of the variation in wheel speed and the fluctuation range $\sigma(G_x)$ of the unsprung fore-aft acceleration.

When the road surface is rough, $\sigma(G_x)$ will be greater than the $\sigma(G_x)$ that is expected from $\sigma(\Delta V_w)$. Hence, it is possible to estimate easily the road surface under a traveling vehicle to be a rough road surface with some bumpiness, such as a drainage pavement, or a flat (smooth) road surface with little bumpiness, such as a dry paved road.

It is to be noted that the quantities usable as the fluctuation range $\sigma(\Delta V_w)$ of variation in wheel speed and the fluctuation range $\sigma(G_x)$ of unsprung fore-aft acceleration $G_x$ are the data of $\Delta V_w$ within a predetermined time (e.g., 0.5 seconds) and any quantity representing the data variation, such as the standard deviation or a half-value width when the data of $G_x$ is assumed to be in a gauss distribution.

Also, the present invention provides the method in which, in the step of estimating a road surface condition, the road surface under a traveling vehicle is estimated to be a flat (smooth) road surface when the calculated fluctuation range $\sigma(G_x)$ of the unsprung fore-aft acceleration is equal to or smaller than the calculated value of the fluctuation range of the unsprung fore-aft acceleration obtained by substituting the fluctuation range $\sigma(\Delta V_w)$ of the variation in wheel speed into a fluctuation range criterion formula representing a predetermined relationship between the fluctuation range of variation in wheel speed and the fluctuation range of unsprung fore-aft acceleration (see equation (1) below).

$$\sigma(G_x)=K\cdot\sigma(\Delta V_w)+\sigma(g) \quad (1)$$

Thus, a fluctuation range criterion formula representing a relationship between the fluctuation range of unsprung fore-aft acceleration and the fluctuation range of variation in wheel speed is found in advance by operating a test vehicle on various road surfaces. Then a road surface condition is estimated, using this fluctuation range criterion formula. Therefore, the road surface under a traveling vehicle can be estimated with accuracy to be a rough road surface with some bumpiness or a flat road surface.

Also, the present invention provides the method in which, in the step of estimating a road surface condition, the road surface under a traveling vehicle is estimated to be an irregular (ungraded) road surface when the fluctuation range of the variation in wheel speed exceeds a predetermined maximum fluctuation range of variation in wheel speed or when the calculated fluctuation range of the unsprung fore-aft acceleration exceeds a predetermined maximum fluctuation range of acceleration.

The "irregular (ungraded) road surface" is a road surface, such as an unpaved or cracked road surface or a sherbet-like snowy road surface with much bumpiness and irregularity, which does not allow normal road-hugging performance of tires. When the road surface under a traveling vehicle is an irregular road surface, one of both of the fluctuation range of wheel speed and the fluctuation range of unsprung fore-aft acceleration may be greater. Hence, the accuracy in estimating a road surface condition under a traveling vehicle can be further improved if the road surface is classified into three categories of irregular road, rough road with some bumpiness, and flat road.

Also, the present invention provides the method which further includes the steps of detecting an unsprung lateral acceleration $G_y$, in addition to the unsprung fore-aft acceleration $G_x$, calculating a fluctuation range $\sigma(G_y)$ of the unsprung lateral acceleration, and determining whether the estimated flat road surface is a dry paved road surface or not from a relationship between the calculated fluctuation range $\sigma(G_y)$ of the unsprung lateral acceleration and the fluctuation range $\sigma(G_x)$ of the unsprung fore-aft acceleration.

Thus, by finding the relationship between the value of the fluctuation range $\sigma(G_x)$ of the unsprung fore-aft acceleration and the value of the fluctuation range $\sigma(G_y)$ of the unsprung lateral acceleration, it is possible to determine whether the estimated flat road is a flat dry paved road or a flat icy road. Therefore, the road surface condition under a traveling vehicle can be estimated with greater accuracy.

Also, the present invention provides the method which further includes the steps of detecting an unsprung lateral acceleration $G_y$, in addition to the unsprung fore-aft acceleration $G_x$, calculating an absolute value $|G_x \times G_y|$ of the product $G_x \times G_y$ of the unsprung fore-aft acceleration and the unsprung lateral acceleration and a product $|G_x| \times |G_y|$ of the absolute value $|G_x|$ of the unsprung fore-aft acceleration and the absolute value $|G_y|$ of the unsprung lateral acceleration, and determining whether the estimated flat road surface is a dry paved road surface or not from a relationship between the calculated $|G_x \times G_y|$ and $|G_x| \times |G_y|$.

Thus, by finding the relationship between the value of $|G_x \times G_y|$ and the value of $|G_x| \times |G_y|$, it is possible to determine whether the estimated flat road is a flat dry paved road or a flat icy road. Therefore, the road surface condition under a traveling vehicle can be estimated with greater accuracy.

Also, the present invention provides the method in which the step of estimating a road surface condition further includes the steps of estimating whether the road surface under a traveling vehicle is a rough (bumpy) road surface or not from a relationship between the fluctuation range of the variation in wheel speed and the fluctuation range of the unsprung fore-aft acceleration, and calculating, when the estimated road surface is a rough road surface, a peak frequency at a peak position within a band of 200 to 230 Hz of a frequency spectrum obtained by a frequency analysis of the detected unsprung fore-aft acceleration and estimating whether the rough road surface is a slippery road surface or not from the peak frequency and the wheel speed. And in the step of estimating whether the road surface under a traveling vehicle is a rough road surface or not, the road surface under a traveling vehicle is estimated to be a rough road surface when the calculated fluctuation range of the unsprung fore-aft acceleration is greater than the calculated value of the fluctuation range of the unsprung fore-aft acceleration obtained by substituting the fluctuation range of the variation in wheel speed into a predetermined fluctuation range criterion formula representing a relationship between the fluctuation range of unsprung fore-aft acceleration and the fluctuation range of variation in wheel speed. Also, in the step of estimating whether the rough road surface is a slippery road surface or not, the rough road surface is estimated to be a slippery road surface whose road surface friction coefficient $\mu$ is lower than 0.3 when the detected peak frequency is lower than the calculated value of peak frequency obtained by substituting the detected wheel speed into a frequency criterion formula representing a predetermined relationship between peak frequency and wheel speed.

Note that the "rough (bumpy) road surface" is a road surface intermediate between irregular (ungraded) road surfaces which do not allow normal road-hugging performance of tires and flat (smooth) road surfaces with little bumpiness, such as a dry paved road surface. It refers to a "rough road surface with some bumpiness" recited in claim 1.

If the road surface is bumpy, then $\sigma(G_x)$ will be greater than the $\sigma(G_x)$ that can be expected from $\sigma(\Delta V_w)$. Therefore, the road surface under a traveling vehicle can be estimated easily to be a rough road surface, such as a drainage pavement, or a flat road surface with little bumpiness, such as a dry paved road.

Further, when the road surface is a rough road surface, it is estimated whether the rough road surface is a slippery road surface of not, from a peak frequency $f_p$, which is a frequency at the peak position within a band of 200 to 230 Hz of a frequency spectrum obtained by a frequency analysis of an unsprung fore-aft acceleration, and a wheel speed $V_w$. Accordingly, it is possible to estimate with accuracy whether the rough road surface is a not-so-slippery road surface, such as a drainage pavement, or a slippery road surface, such as a snowy road surface.

Note that the fluctuation range criterion formula is, for example, a primary expression showing a relationship between the fluctuation range of variation in wheel speed and the fluctuation range of unsprung fore-aft acceleration found by operating a test vehicle on various road surfaces (see equation (1) below).

$$\sigma(G_x) = K \cdot \sigma(\Delta V_w) + \sigma(g) \quad (1)$$

Also, note that the frequency criterion formula is, for example, a primary expression showing a relationship between the peak frequency $f_p$ and the wheel speed $V_w$ found by operating a test vehicle on drainage pavements and snowy roads (see equation (2) below).

$$f_p = a \cdot V_w + b \quad (2)$$

Also, the quantities usable as the fluctuation range $\sigma(\Delta V_w)$ of variation in wheel speed and the fluctuation range $\sigma(G_x)$ of unsprung fore-aft acceleration $G_x$ are the data of $\Delta V_w$ within a predetermined time (e.g., 0.5 seconds) and any quantity representing the data variation, such as the standard deviation $\sigma$ or a half-value width when the data of $G_x$ is assumed to be in a gauss distribution.

Also, the present invention provides the method in which, in the step of estimating a road surface condition, is a rough/bumpy road surface or not, the road surface under a traveling vehicle is estimated to be an irregular (ungraded) road surface when the calculated fluctuation range of the variation in wheel speed exceeds a predetermined maximum fluctuation range of variation in wheel speed or when the fluctuation range of the unsprung fore-aft acceleration exceeds a predetermined maximum fluctuation range of acceleration.

Here the "irregular (ungraded) road" is a road surface that does not allow normal road-hugging performance of tires as described earlier. When the road surface under a traveling vehicle is an irregular road, one or both of the fluctuation range of variation in wheel speed and the fluctuation range of unsprung fore-aft acceleration will be greater than normal.

Thus, when $\sigma(\Delta V_w) > \sigma_{AM}$ or $\sigma(G_x) > \sigma_{GM}$, the road surface is estimated to be an irregular road, thereby distinguishing it from rough road surfaces, such as drainage pavements or snowy roads.

Accordingly, the road surface under a traveling vehicle can be estimated to be an irregular road reliably.

Also, the present invention provides a road surface condition estimating apparatus that realizes the initially described method for estimating a road surface condition. And the apparatus includes an unsprung fore-aft acceleration detecting means disposed at an unsprung position of a vehicle to detect an unsprung fore-aft acceleration $G_x$, a wheel speed detecting means for detecting wheel speed $V_w$, a wheel speed variation calculating means for calculating a variation $\Delta V_w$ in the detected wheel speed, a fluctuation range calculating means for calculating a fluctuation range $\sigma(\Delta V_w)$ of the variation in wheel speed and a fluctuation range $\sigma(G_x)$ of the unsprung fore-aft acceleration, a storage means for storing a fluctuation range criterion formula ($\sigma(G_x) = K \cdot \sigma(\Delta V_w) + \sigma(g)$) representing a predetermined relationship between the fluctuation range of variation in wheel speed and the fluctuation range of unsprung fore-aft acceleration, and a road surface condition estimating means for estimating a road surface condition under a traveling vehicle, using the calculated fluctuation range of the variation in wheel speed and fluctuation range of the unsprung fore-aft acceleration and the fluctuation range criterion formula.

By employing a structure as described above, a road surface condition estimating apparatus can be implemented that can easily estimate whether the road surface under a traveling vehicle is a rough road surface with some bumpiness, such as a drainage pavement, or a flat road surface with little bumpiness, such as a dry paved road.

Also, the present invention provides a road surface condition estimating apparatus which further includes an unsprung lateral acceleration detecting means disposed at an unsprung position of a vehicle to detect an unsprung lateral acceleration $G_y$, and an unsprung lateral acceleration fluctuation range calculating means for calculating a fluctuation range $\sigma(G_y)$ of the detected unsprung lateral acceleration. And the apparatus is such that the road surface condition estimating means determines whether the estimated road surface is a dry paved road or not from a relationship between the calculated fluctuation range $\sigma(G_y)$ of the unsprung lateral acceleration and fluctuation range $\sigma(G_x)$ of the unsprung fore-aft acceleration.

This makes it possible to determine with certainty whether the estimated road surface is a flat dry paved road or a flat icy road.

Also, the present invention provides a road surface condition estimating apparatus which further includes an unsprung lateral acceleration detecting means disposed at an unsprung position of a vehicle to detect an unsprung lateral acceleration $G_y$, and an acceleration product calculating means for calculating an absolute value $|G_x \times G_y|$ of the product of the unsprung fore-aft acceleration $G_x$ and the unsprung lateral acceleration $G_y$, and a product $|G_x| \times |G_y|$ of the absolute value $|G_x|$ of the unsprung fore-aft acceleration and the absolute value $|G_y|$ of the unsprung lateral acceleration. And the apparatus is such that the road surface condition estimating means determines whether the estimated road surface is a dry paved road or not from a relationship between $|G_x \times G_y|$ and $|G_x| \times |G_y|$.

This also makes it possible to determine with certainty whether the estimated road surface is a flat dry paved road or a flat icy road.

Also, the present invention provides a road surface condition estimating apparatus which further includes a frequency analyzing means for performing a frequency analysis on the detected unsprung fore-aft acceleration, and a peak frequency calculating means for calculating a peak frequency at a peak position within a band of 200 to 230 Hz of a frequency spectrum obtained by the frequency analysis. And the apparatus is such that the storage means stores a predetermined maximum fluctuation range of wheel speed, a predetermined maximum fluctuation range of unsprung fore-aft acceleration, and a fluctuation range criterion formula representing a relationship between the fluctuation range of unsprung fore-aft acceleration and the fluctuation range of variation in wheel speed, and the road surface condition estimating means determines the road surface to be a rough road surface when the calculated fluctuation range of the unsprung fore-aft acceleration is greater than the calculated value of the fluctuation range of unsprung fore-aft acceleration obtained by substituting the fluctuation range of the variation in wheel speed into the fluctuation range criterion formula and, in addition, when the fluctuation range of the variation in wheel speed and the fluctuation range of the unsprung fore-aft acceleration are smaller than the maximum fluctuation range of variation in wheel speed and the maximum fluctuation range of unsprung fore-aft acceleration, respectively. And also the apparatus is such that, when the determined road surface is a rough road surface, the road surface condition estimating means estimates the rough road surface to be a slippery road surface whose road surface friction coefficient μ is lower than 0.3 when the detected peak frequency is lower than the calculated value of peak frequency obtained by substituting the detected wheel speed into a frequency criterion formula representing a predetermined relationship between peak frequency and wheel speed.

As a result, it is possible to estimate with accuracy whether the road surface under a traveling vehicle is a rough road surface or not. At the same time, when the road surface is a rough road surface, it can be easily estimated whether the road surface is a slippery road surface or not.

It is to be understood that the foregoing summary of the invention does not necessarily recite all the features essential to the invention, and subcombinations of all these features are intended to be included in the invention.

BEST MODE FOR CARRYING OUT THE INVENTION

Hereinafter, the invention will be described based on preferred embodiments which do not intend to limit the scope of the claims of the present invention but exemplify the invention. All of the features and the combinations thereof described in the embodiments are not necessarily essential to the invention.

First Embodiment

Figure 1:
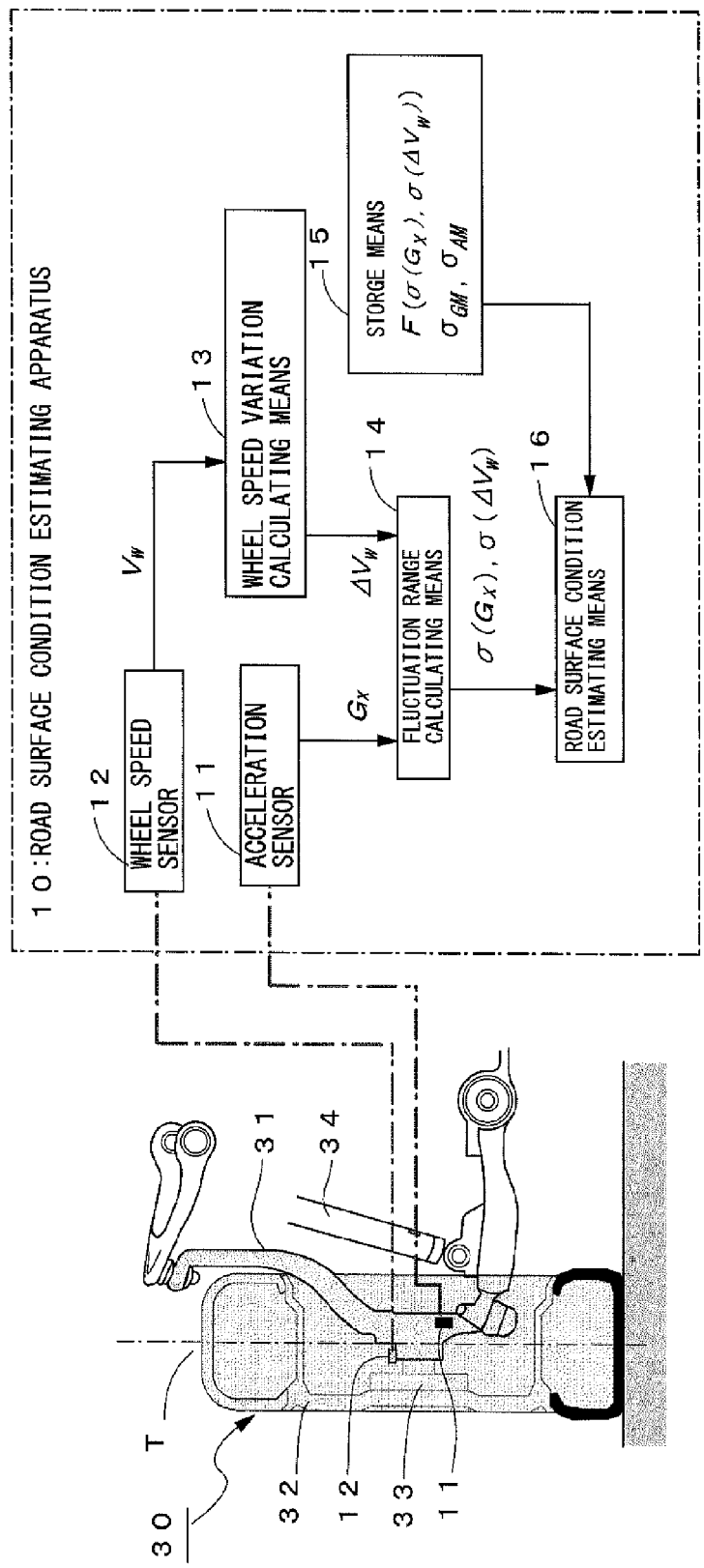
FIG. 1 is a diagram showing a structure of a road surface condition estimating apparatus in accordance with the first embodiment of the present invention.

FIG. 1 is a functional block diagram of a road surface condition estimating apparatus 10 according to a first embodiment of the present invention.

The road surface condition estimating apparatus 10 includes an acceleration sensor 11 as an unsprung fore-aft acceleration detecting means, a wheel speed sensor 12 as a wheel speed detecting means, a wheel speed variation calculating means 13, a fluctuation range calculating means 14, a storage means 15, and a road surface condition estimating means 16. Note that the means from the fluctuation range calculating means 14 to the road surface condition estimating means 16 may be constituted by computer software, for instance.

As shown in FIG. 1, the acceleration sensor 11, which is attached to a knuckle 31, detects the unsprung fore-aft acceleration $G_x$. The knuckle 31 is a non-rotating-side member (unsprung member) of a wheel unit 30, which is coupled via a bearing to a wheel hub 33 rotating together with the wheel 32 with a tire T fitted thereon. The knuckle 31 is suspended from the not-shown vehicle body by a suspension member, such as a shock absorber 34.

The wheel speed sensor 12 detects the rotational speed $V_w$ of a wheel (hereinafter referred to as wheel speed). Employed in this embodiment to detect the angle of rotation of the wheel is a wheel speed sensor of a known electromagnetic induction type, which is equipped with a rotor having gear teeth on its periphery and rotating together with the wheel, a yoke constituting a magnetic circuit in combination with the rotor, and a coil for detecting flux changes of the magnetic circuit. The yoke and the coil are mounted on the knuckle 31.

In the present embodiment, as will be described later, the data of wheel speed $V_w$ and the data of unsprung fore-aft acceleration $G_x$ to be used are their respective values after an A-D conversion of the sampled outputs of the wheel speed sensor 12 and the acceleration sensor 11 so as to enable calculation of the fluctuation ranges $\sigma(\Delta V_w)$ and $\sigma(G_x)$.

It should be noted that with a vehicle equipped with a vehicle control means for controlling its running condition using a network, such as CAN (controller area network), it is preferable that the data of wheel speed $V_w$ is obtained from the network.

The wheel speed variation calculating means 13 calculates the variation $\Delta V_w$ in wheel speed $V_w$ detected by the wheel speed sensor 12. The difference in wheel speed between sampling points can be used as the variation $\Delta V_w$ in wheel speed.

The fluctuation range calculating means 14 calculates the fluctuation range $\sigma(G_x)$ of the unsprung fore-aft acceleration $G_x$ detected by the acceleration sensor 11 and the fluctuation range $\sigma(\Delta V_w)$ of the variation $\Delta V_w$ in wheel speed calculated by the wheel speed variation calculating means 13. Since the data of unsprung fore-aft acceleration $G_x$ and the data of the variation $\Delta V_w$ in wheel speed for a predetermined time T (for example, T=0.5 seconds) can be approximated by gauss distributions, the fluctuation range $\sigma(G_x)$ is used as the standard deviation σ for the respective distributions in the present embodiment.

It should be noted that the fluctuation range σ, which may be any quantity representing data variation within a predetermined time length, may be a half-value width or 2σ, for instance.

The storage means 15 stores the predetermined maximum value $\sigma_{GM}$ of the fluctuation range of unsprung fore-aft acceleration, the predetermined maximum value $\sigma_{AM}$ of the fluctuation range of variation in wheel speed, and a fluctuation range criterion formula, which is a primary expression (see equation 1 below) showing a predetermined relationship between the fluctuation range $\sigma(\Delta V_w)$ of variation in wheel speed and the fluctuation range $\sigma(G_x)$ of unsprung fore-aft acceleration.

$$\sigma(G_x)=K \cdot \sigma(\Delta V_w)+\sigma(g) \qquad (1)$$

where K is a proportionality coefficient and $\sigma(g)$ is a segment of the primary expression.

The fluctuation range criterion formula (1) is an expression obtained using the data of $\sigma(G_x)$ and $\sigma(\Delta V_w)$ which were obtained by operating a test vehicle on a variety of road surfaces. Using these data, it is also possible to set the maximum value $\sigma_{GM}$ of the fluctuation range of unsprung fore-aft acceleration and the maximum value $\sigma_{AM}$ of the fluctuation range of variation in wheel speed.

The road surface condition estimating means 16 estimates a road surface condition under a traveling vehicle, using the fluctuation range $\sigma(G_x)$ of unsprung fore-aft acceleration and fluctuation range $\sigma(\Delta V_w)$ of variation in wheel speed calculated by the fluctuation range calculating means 14, the maximum value $\sigma_{GM}$ of the fluctuation range of unsprung fore-aft acceleration and maximum value $\sigma_{AM}$ of the fluctuation range of variation in wheel speed taken from the storage means 15, and the fluctuation range criterion formula representing a relationship between the fluctuation range $\sigma(\Delta V_w)$ of variation in wheel speed and the fluctuation range $\sigma(\Delta_x)$ of unsprung fore-aft acceleration.

More specifically, the road surface condition estimating means 16 estimates the road surface to be a flat road surface with little bumpiness, such as a dry paved road, when $\sigma(G_x) \leq K \cdot \sigma(\Delta V_w)+\sigma(g)$, that is, when the calculated fluctuation range $\sigma(G_x)$ of unsprung fore-aft acceleration is smaller than the calculated value of the fluctuation range of unsprung fore-aft acceleration $(\sigma_{cal}(G_x)=K \cdot \sigma(\Delta V_w)+\sigma(g))$, which is calculated by substituting the calculated fluctuation range $\sigma(\Delta V_w)$ of variation in wheel speed into the fluctuation range criterion formula (1), or estimates it to be a rough road with some bumpiness, such as a drainage pavement, when the calculated value of $\sigma(G_x)$ is greater than the calculated value of $\sigma_{cal}(G_x)$.

In this embodiment, when the fluctuation range $\sigma(G_x)$ of unsprung fore-aft acceleration is greater than the maximum value $\sigma_{GM}$ of the fluctuation range of unsprung fore-aft acceleration or when the fluctuation range $\sigma(\Delta V_w)$ of variation in wheel speed is greater than the maximum value $\sigma_{AM}$ of the fluctuation range of variation in wheel speed, the road surface condition estimating means 16 determines the road surface to be an irregular (ungraded) road surface, such as an unpaved or cracked road surface or a sherbet-like snowy road surface with much bumpiness and irregularity, which does not allow normal road-hugging performance of tires. Thus, the road surface condition estimating means 16 distinguishes this road surface from a rough road surface with some bumpiness, such as a drainage pavement. Accordingly, the road surface condition estimating means 16 can estimate the road surface to be in one of three different conditions, namely, a flat (smooth) road surface, a rough road surface with some bumpiness, and an irregular (ungraded) road surface.

Next, a description is given of a method for estimating a road surface condition using the road surface condition estimating apparatus 10.

First an acceleration sensor 11 detects an unsprung fore-aft acceleration $G_x$, which is a fore-aft acceleration acting on a knuckle 31 and sends the data to a fluctuation range calculating means 14. At the same time, a wheel speed sensor 12 detects a wheel speed $V_w$ and sends the data to a wheel speed variation calculating means 13.

The wheel speed variation calculating means 13 calculates a variation $\Delta V_w$ in wheel speed, which is a variation in wheel speed $V_w$, and sends the data to the fluctuation range calculating means 14.

The fluctuation range calculating means 14 calculates a fluctuation range $\sigma(G_x)$ of unsprung fore-aft acceleration $G_x$ and a fluctuation range $\sigma(\Delta V_w)$ of the variation $\Delta V_w$ in wheel speed calculated by the wheel speed variation calculating means 13, respectively, and sends the data to a road surface condition estimating means 16.

The road surface condition estimating means 16 estimates a road surface condition under a traveling vehicle to be one of a flat road, a rough road, and an irregular road, using the fluctuation range $\sigma(G_x)$ of unsprung fore-aft acceleration and fluctuation range $\sigma(\Delta V_w)$ of variation in wheel speed, the maximum value $\sigma_{GM}$ of the fluctuation range of unsprung fore-aft acceleration and maximum value $\sigma_{VM}$ of the fluctuation range of variation in wheel speed, and the fluctuation range criterion formula representing a relationship between the fluctuation range $\sigma(\Delta V_w)$ of variation in wheel speed and the fluctuation range $\sigma(G_x)$ of unsprung fore-aft acceleration. More specifically, the estimation is done as follows:

A: $\sigma(\Delta V_w) > \sigma_{AM}$ or $\sigma(G_x) > \sigma_{GM}$: an irregular (ungraded) road B: $\sigma(G_x) > K \cdot \sigma(\Delta V_w)+\sigma(g)$: a rough road with some bumpiness C: $\sigma(G_x) \leq K \cdot \sigma(\Delta V_w)+\sigma(g)$: a flat (smooth) road Thus, using a road surface condition estimating apparatus 10 according to the first embodiment of this invention, the property of a road surface, for example, whether it is extremely bumpy like an irregular road surface or least bumpy like a flat road surface, can be detected easily without a sensor attached to the tire.

In the first embodiment thus far described, the wheel speed $V_w$ is found from the output of the wheel speed sensor 12. However, it should be noted that with a vehicle provided with an information system (example: CAN (controller area network)) in a vehicle control means for controlling its running condition, it is preferable that the wheel speed $V_w$ is obtained from the information system. This will further simplify the apparatus.

Example 1

A vehicle was prepared with a studless tire of 225/55R17 tire size fitted on the left front wheel and an acceleration sensor attached to the knuckle of the left front wheel. And the vehicle was operated at predetermined speeds (30 km/h to 80 km/h) on flat (smooth) roads (flat paved road and icy road), rough roads with some bumpiness (drainage pavement), and irregular (ungraded) roads to find the relationship between the calculated fluctuation range $\sigma(\Delta V_w)$ of variation in wheel speed and the calculated fluctuation range $\sigma(G_x)$ of unsprung fore-aft acceleration. The results are shown in FIGS. 2A and 2B.

Note that the data of fluctuation range is based on calculation for every 6.5 meters of vehicular run.

Also, the information on the speed of left wheels was acquired from a vehicle information system (line of CAN).

Figure 2A:
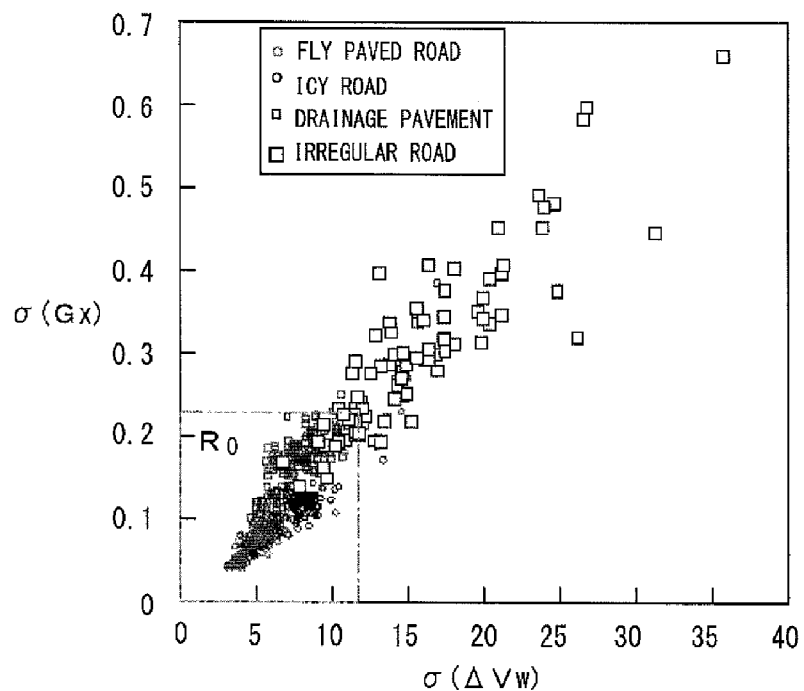
FIG. 2 is diagrams showing a relationship between the fluctuation range of variation in wheel speed and the fluctuation range of unsprung fore-aft acceleration.
Figure 2B:
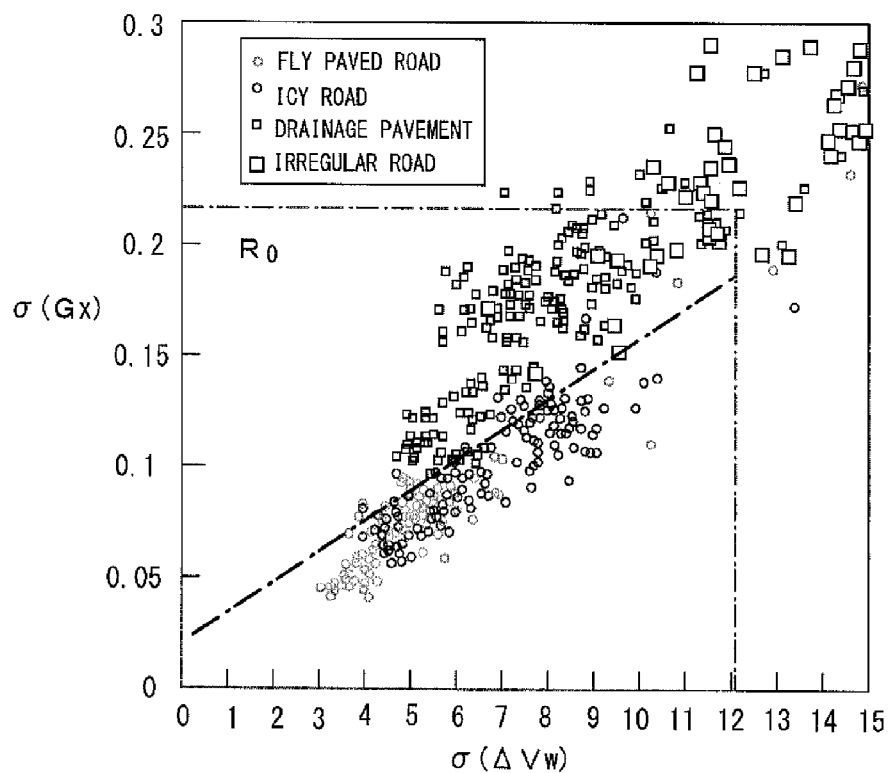

In FIGS. 2A and 2B, the horizontal axis of the diagrams represents $\sigma(\Delta V_w)$, and the vertical axis $\sigma(G_x)$. The lighter circles stand for the data of flat paved roads, the darker circles the data of icy roads, the smaller squares the data of drainage pavements, and the larger squares the data of irregular roads.

The diagram of FIG. 2B is an enlargement of the neighborhood of the origin of the diagram of FIG. 2A, and the straight thick chain line in the diagram represents the fluctuation range criterion formula showing the relationship between $\sigma(\Delta V_w)$ and $\sigma(G_x)$. It is clear from the diagram that the data of flat roads are distributed mostly below the fluctuation range criterion formula, whereas the data of rough roads with some bumpiness are distributed mostly above it. It has been confirmed therefore that it is possible to estimate a road surface under a traveling vehicle to be a flat road with little bumpiness, such as a dry paved road, or a rough road with some bumpiness, such as a drainage pavement, by finding the relationship between the fluctuation range $\sigma(\Delta V_w)$ of variation in wheel speed and the fluctuation range $\sigma(G_x)$ of unsprung fore-aft acceleration.

Also, as shown in FIGS. 2A and 2B, the data of irregular roads are distributed outside the region $R_0$ enclosed with chain lines, that is, where the fluctuation range $\sigma(\Delta V_w)$ of variation in wheel speed is large or where the fluctuation range $\sigma(G_x)$ of unsprung fore-aft acceleration is large.

Accordingly, it has also been confirmed that by appropriately setting the maximum value $\sigma_{GM}$ of the fluctuation range $\sigma(\Delta V_w)$ of unsprung fore-aft acceleration and maximum value $\sigma_{VM}$ of the fluctuation range $\sigma(G_x)$ of variation in wheel speed, it is possible to reliably estimate whether or not the road surface is an irregular road surface, such as an unpaved or cracked road surface or a sherbet-like snowy road surface, which is extremely bumpy and irregular, thus not allowing normal road-hugging performance of tires.

Second Embodiment

Figure 3:
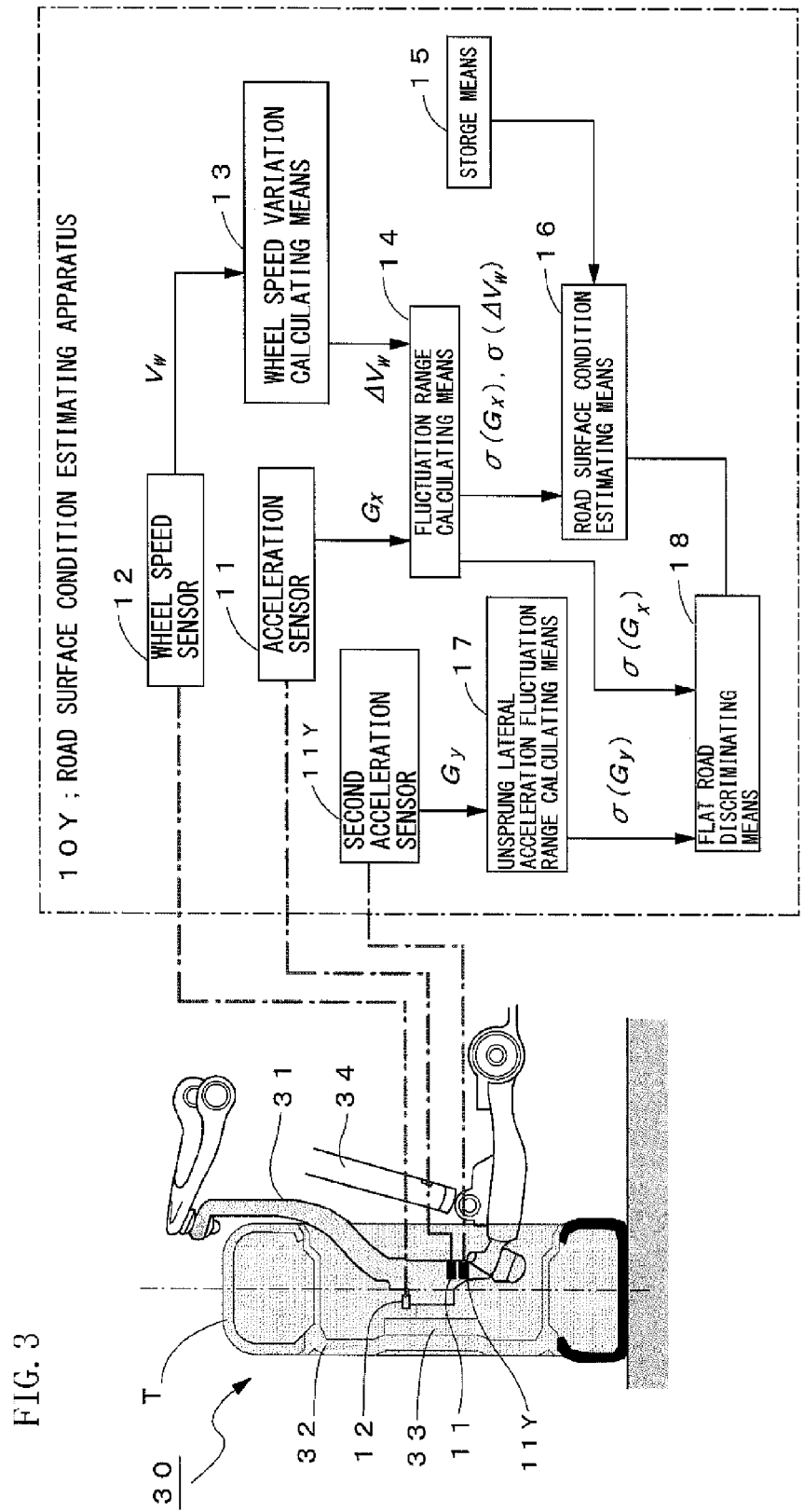
FIG. 3 is a diagram showing a structure of a road surface condition estimating apparatus in accordance with the second embodiment of the present invention.

In the foregoing first embodiment, a road surface condition under a traveling vehicle is estimated to be one of a flat road, a rough road with some bumpiness, and an irregular road. However, a road surface condition estimating apparatus 10Y provided on a knuckle 31 with an acceleration sensor 11 for detecting unsprung fore-aft acceleration and a second acceleration sensor 11Y as an unsprung lateral acceleration detecting means, as shown in FIG. 3, can be used to estimate whether the flat (smooth) road estimated in the first embodiment is a flat road having a high road surface friction coefficient $\mu$ ($\mu > 0.7$) or a flat icy road having a low road surface friction coefficient $\mu$ ($\mu < 0.2$).

Note that the acceleration sensor 11 to be used may be an acceleration sensor capable of detecting accelerations in two directions, namely, the unsprung fore-aft acceleration $G_x$ and the unsprung lateral acceleration $G_y$.

The road surface condition estimating apparatus 10Y is equal to a road surface condition estimating apparatus 10 of the first embodiment further provided with a second acceleration sensor 11Y for detecting a lateral acceleration at an unsprung position of a vehicle (unsprung lateral acceleration) $G_y$, an unsprung lateral acceleration fluctuation range calculating means 17 for calculating the fluctuation range $\sigma(G_y)$ of unsprung lateral acceleration, and a flat road discriminating means 18.

The flat road discriminating means 18 discriminates the flat road estimated by the road surface condition estimating means 16 between a flat paved road and an icy road, using the second discriminant formula (see equation (3) below) representing a relationship between the fluctuation range $\sigma(G_x)$ of unsprung fore-aft acceleration calculated by the fluctuation range calculating means 14 and the fluctuation range $\sigma(G_y)$ of unsprung lateral acceleration calculated by the unsprung lateral acceleration fluctuation range calculating means 17.

$$\sigma(G_x) = a \cdot \sigma(G_y) + b \quad (3)$$

Here a description is given of the second discriminant formula.

During the travel of a vehicle, the unsprung parts of the vehicle vibrate by gaining forces from the ground contact areas or from tires themselves. When the road surface friction coefficient $\mu$ is high, the unsprung parts cannot move widely because of the strong restraining forces from the road surface. In particular, they cannot move easily in the lateral direction (axial direction of the tire) which is perpendicular to the rolling direction of the tire. However, when the road surface friction coefficient $\mu$ is low, the unsprung parts can move easily in the lateral direction because of reduced restraining forces from the road surface. As a result, the fluctuation range $\sigma(G_y)$ of unsprung lateral acceleration will be larger.

In other words, the ratio of the fluctuation range $\sigma(G_y)$ of unsprung lateral acceleration to the fluctuation range $\sigma(G_x)$ of unsprung fore-aft acceleration is greater on road surfaces with a low road surface friction coefficient $\mu$.

Figure 4:
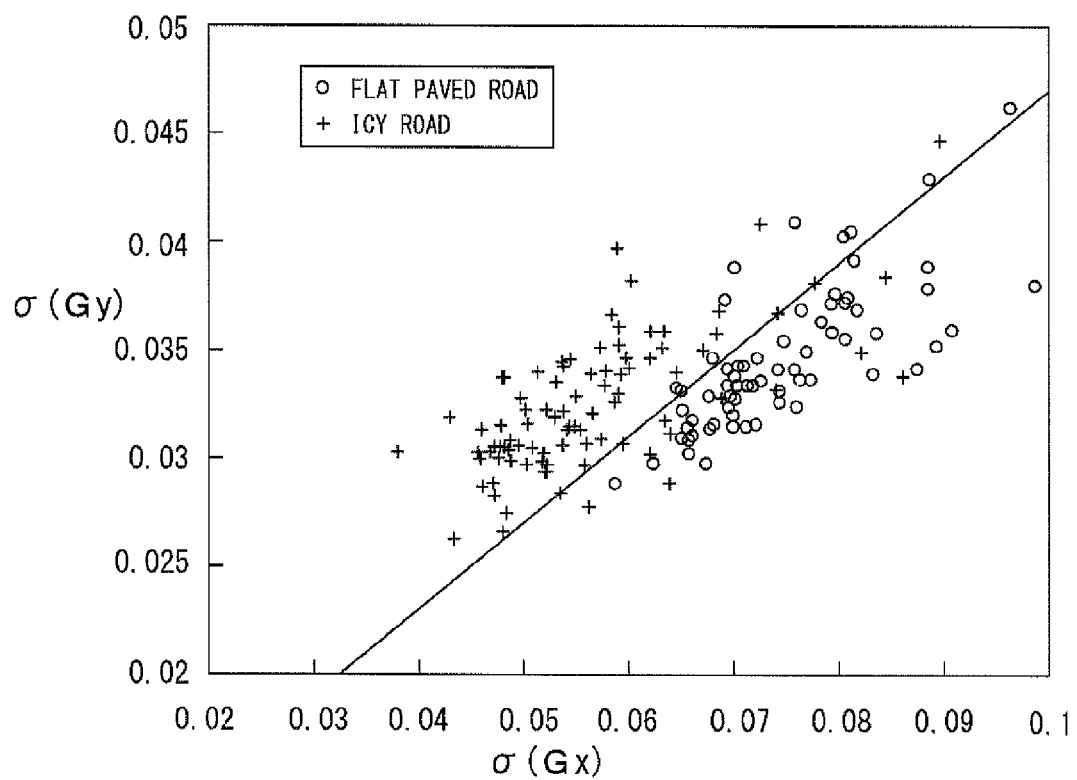
FIG. 4 is a diagram showing a relationship between the fluctuation range of unsprung fore-aft acceleration and the fluctuation range of unsprung lateral acceleration.

FIG. 4 shows the results of a test in which a vehicle with a studless tire of 225/55R17 tire size fitted on the left front wheel and an acceleration sensor attached to the knuckle of the left front wheel was operated at a predetermined speed (30 km/h) on a flat paved road ($\mu \approx 0.8$) and an icy road ($\mu \approx 0.18$). The diagram shows the relationship between the calculated fluctuation range $\sigma(G_x)$ of unsprung fore-aft acceleration and the calculated fluctuation range $\sigma(G_y)$ of unsprung lateral acceleration. The data of fluctuation range is based on calculation for every 6.5 meters of vehicular run.

It is clear that the data on a flat paved road indicated by circles are distributed mostly below the straight chain line and the data on an icy road indicated by crosses mostly above the straight line. Accordingly, the above-mentioned second discriminant formula, if it represents the straight line, makes it possible to discriminate the flat road estimated by the road surface condition estimating means 16 between a flat paved road and an icy road.

Third Embodiment

In the second embodiment, the flat road estimated by the road surface condition estimating means 16 is discriminated between a flat paved road and and an icy road from a relationship between the fluctuation range $\sigma(G_x)$ of unsprung fore-aft acceleration and the fluctuation range $\sigma(G_y)$ of unsprung lateral acceleration. However, the arrangement may be such that the absolute value $|G_x \times G_y|$ of the product of unsprung fore-aft acceleration $G_x$ and unsprung lateral acceleration $G_y$ (absolute value of the mean of products actually) and the product $|G_x| \times |G_y|$ of the absolute value $|G_x|$ of unsprung fore-aft acceleration and the absolute value $|G_y|$ of unsprung lateral acceleration (mean of the products of absolute values actually) are calculated and it is determined whether the estimated flat (smooth) road is a dry paved road or not from the relationship between the calculated $|G_x \times G_y|$ and $|G_x| \times |G_y|$.

Figure 5:
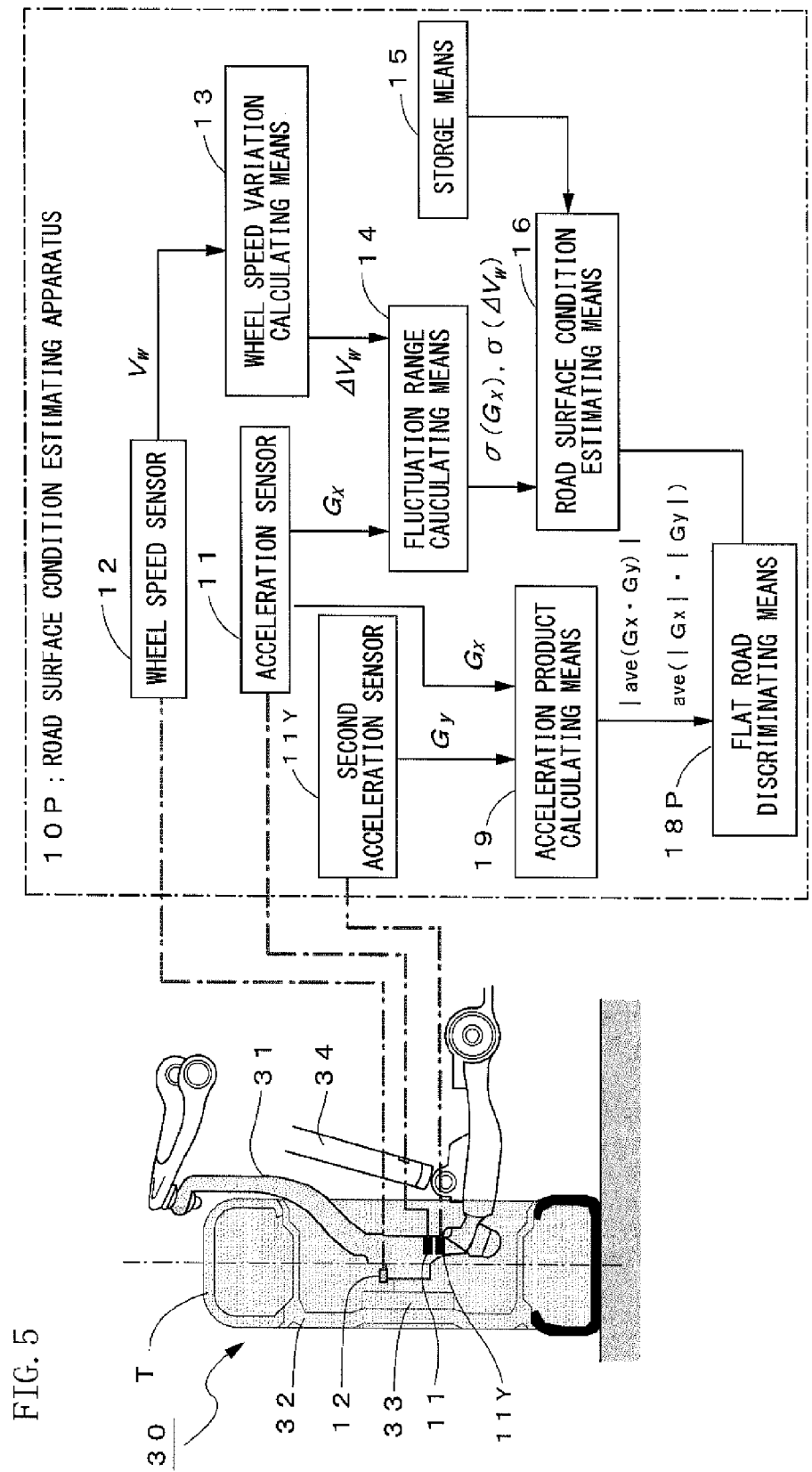
FIG. 5 is a diagram showing a structure of a road surface condition estimating apparatus in accordance with the third embodiment of the present invention.

FIG. 5 is a diagram showing a structure of a road surface condition estimating apparatus 10P according to a third embodiment of the present invention. The road surface condition estimating apparatus 10P is equal to the road surface condition estimating apparatus 10 of the first embodiment further provided with a second acceleration sensor 11Y for detecting the lateral acceleration at an unsprung position of a vehicle (unsprung lateral acceleration) $G_y$, an acceleration product calculating means 19 for calculating the absolute value of the mean of $G_x \times G_y$ and the mean of the product $|G_x| \times |G_y|$ of the absolute value $|G_x|$ of $G_x$ and the absolute value $|G_y|$ of $G_y$, and a flat road discriminating means 18P.

The flat road discriminating means 18P discriminates the flat road estimated by the road surface condition estimating means 16 between a flat paved road and an icy road, using the absolute value ($|ave (G_x \times G_y)|$) of the mean of $G_x \times G_y$ calculated by the acceleration product calculating means 19, the mean ($|ave\ (|G_x|\times|G_y|)|$) of $|G_x|\times|G_y|$, and a discriminant curve representing the relationship between $|ave\ (G_x\times G_y)|$ and $ave\ (|G_x|\times|G_y|)$.

Here a description is given of the discriminant curve.

The unsprung parts of a traveling vehicle are subject to vibrations from the ground contact areas, forces generated by tires themselves, forces due to vehicular attitude changes communicated via the suspension, etc. And on flat roads whose road surface friction coefficient μ is low, the unsprung parts of the vehicle can move more freely due to reduced restraints from the road surface. As a result, a phase difference can occur between the unsprung fore-aft acceleration $G_x$ and the unsprung lateral acceleration $G_y$, thus changing the plus and minus of $G_x\times G_y$. Hence, it is possible to determine with improved accuracy whether the estimated flat road is a flat dry paved road or a flat icy road by finding the relationship between the values of $|G_x\times G_y|$ and $|G_x|\times|G_y|$.

Figure 6:
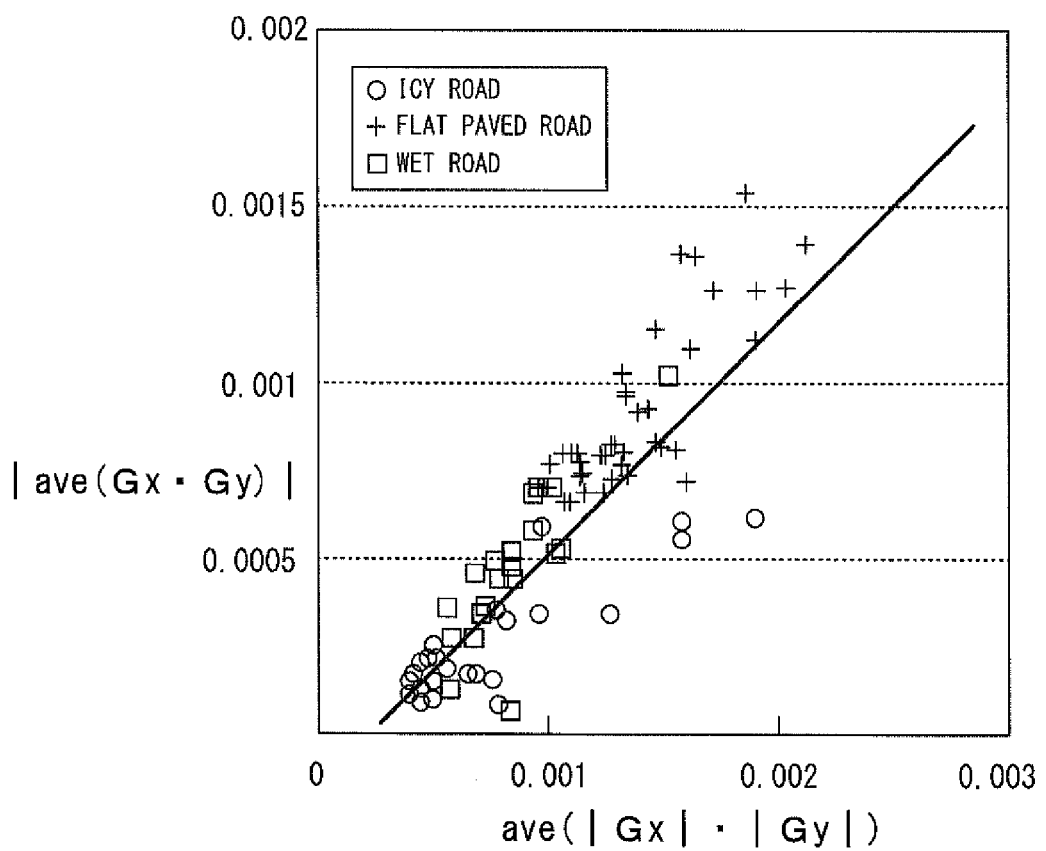
FIG. 6 is a diagram showing a relationship between the absolute value of the mean of the product of the fluctuation range of unsprung fore-aft acceleration and the unsprung lateral acceleration and the mean of the product of the absolute value of the fluctuation range of unsprung fore-aft acceleration and the absolute value of unsprung lateral acceleration.

FIG. 6 shows the results of a test in which a vehicle with a studless tire of 225/55R17 tire size fitted on the left front wheel and an acceleration sensor attached to the knuckle of the left front wheel was operated at a fixed speed (40 km/h) on a flat paved road (μ≅0.8) and an icy road (μ≅0.18). The diagram shows the relationship between $|ave\ (G_x\times G_y)|$ and $ave\ (G_x|\times|G_y|)$. The data of the means is based on calculation for every 6.5 meters of vehicular run.

It is clear that the data on a flat paved road indicated by crosses are distributed mostly above the thick straight chain line and the data on an icy road indicated by circles mostly below the curved line.

In other words, when the road surface friction coefficient μ is high, the absolute value of the mean of the products $|ave\ (G_x\times G_y)|$ will be greater, and ideally will be equal to the mean $ave\ (|G_x|\times|G_y|)$ of the product of individual absolute values $|G_x|$ and $|G_y|$. Hence, the data on a flat paved road are distributed mostly above the straight line.

On the other hand, when the road surface friction coefficient μ is low, the plus and minus of $G_x\times G_y$ changes and the absolute value $|ave\ (G_x\times G_y)|$ of the mean $ave\ (G_x\times G_y)$ becomes smaller. Accordingly, the data on an icy road are distributed mostly below the straight line.

Hence, by preparing an approximation formula representing this straight line and a map showing the demarcation by the straight line, it is possible to discriminate the flat road estimated by the road surface condition estimating means 16 between a flat paved road and an icy road.

Fourth Embodiment

In the first embodiment, the road surface condition under a traveling vehicle is estimated to be one of a flat (smooth) road, a rough road with some bumpiness, and an irregular (ungraded) road. However, if the frequency spectrum of an unsprung fore-aft acceleration obtained by a frequency analysis on the time-series waveform of the unsprung fore-aft acceleration is used, it can be easily estimated whether a rough road surface is a slippery road surface or not, when the road surface estimated in the first embodiment is a rough road surface.

That is, on rough road surfaces, the position of the peak frequency $f_p$ of the vibration of a tire caused by the input from the road surface is dependent on the slipperiness of the road surface. Therefore, if the relationship between the position of the peak frequency $f_p$ determined from the wheel speed $V_w$ and the position of actually measured peak frequency $f_p$ is found, then the rough road surface can be easily estimated to be a high μ road, such as a drainage pavement, or a slippery road, such as a snowy road.

Figure 7:
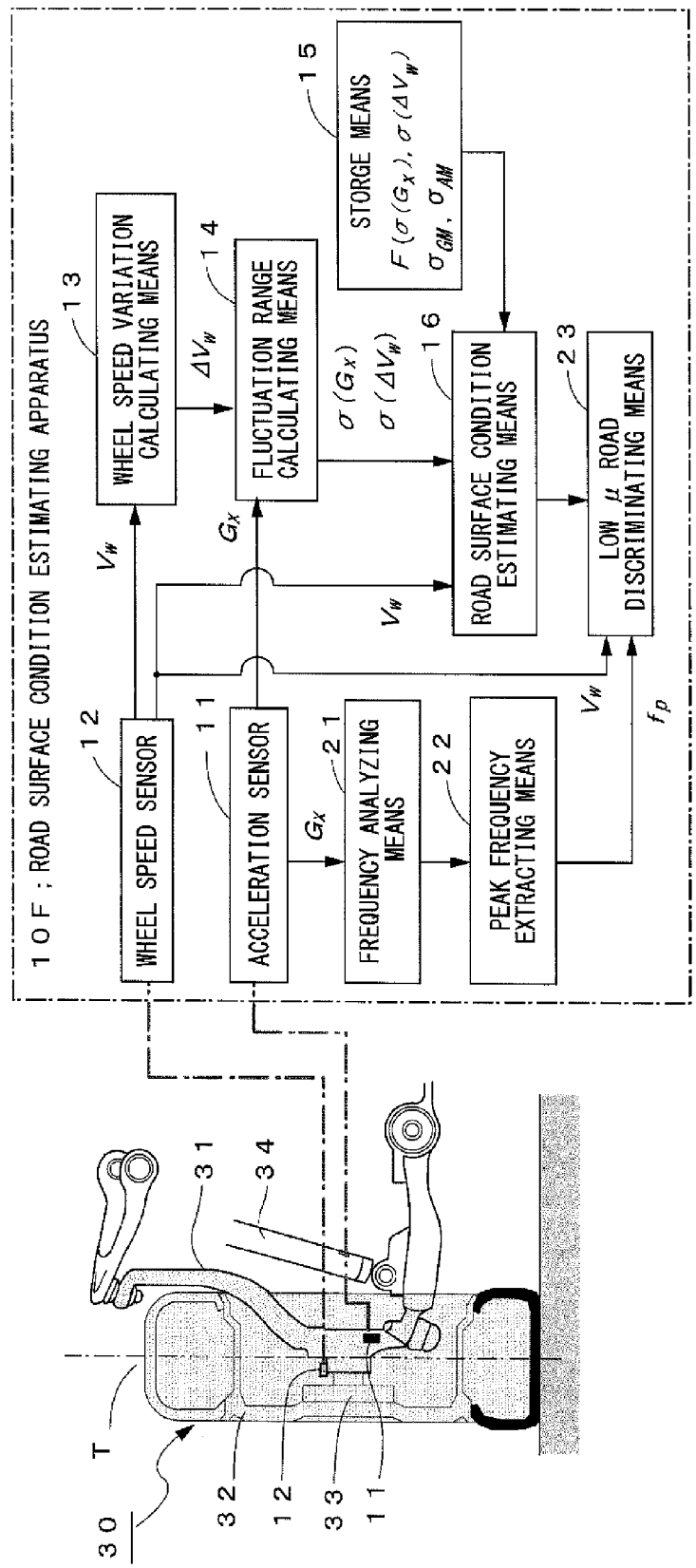
FIG. 7 is a diagram showing a structure of a road surface condition estimating apparatus in accordance with the fourth embodiment of the present invention.

FIG. 7 is a functional block diagram of a road surface condition estimating apparatus 10F according to a fourth embodiment of the present invention.

The road surface condition estimating apparatus 10F includes an acceleration sensor 11 as an unsprung fore-aft acceleration detecting means, a wheel speed sensor 12 as a wheel speed detecting means, a wheel speed variation calculating means 13, a fluctuation range calculating means 14, a storage means 15, a road surface condition estimating means 16, a frequency analyzing means 21, a peak frequency extracting means 22, and a low μ road discriminating means 23.

The acceleration sensor 11, the wheel speed sensor 12, and the means from the wheel speed fluctuation range calculating means 13 to the road surface condition estimating means 16, having the same reference numerals as those in the first embodiment, are of the same structure as those in the first embodiment. Therefore the description thereof will be omitted.

Note that the frequency analyzing means 21, the peak frequency extracting means 22, and the low μ road discriminating means 23 may also be constituted by computer software, for instance.

The frequency analyzing means 21 obtains a frequency spectrum of unsprung fore-aft acceleration by performing a frequency analysis on the time-series waveform of the unsprung fore-aft acceleration detected by the acceleration sensor 11.

Figure 8:
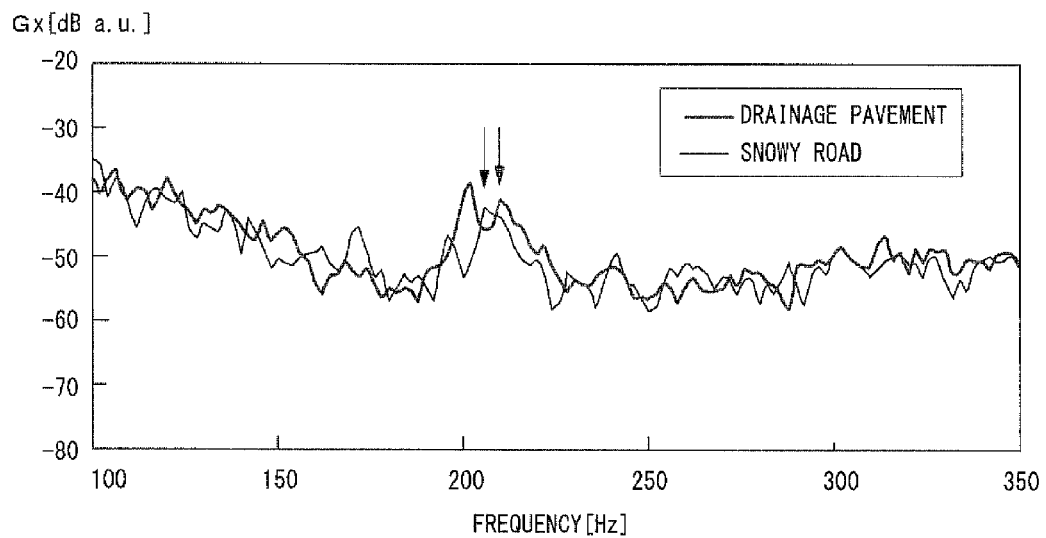
FIG. 8 is a diagram showing examples of frequency spectra of unsprung fore-aft acceleration.

FIG. 8 is a diagram showing examples of frequency spectra of unsprung fore-aft acceleration. The horizontal axis of the diagram represents the frequency, and the vertical axis the unsprung fore-aft acceleration $G_x$. The thick solid line in the diagram shows a frequency spectrum when a vehicle traveled on a drainage pavement, and the thin solid line a frequency spectrum when the vehicle traveled on a snowy road.

The peak frequency extracting means 22 extracts a peak frequency $f_p$ which is the frequency at the peak position within the band of 200 to 230 Hz of the frequency spectrum of unsprung fore-aft acceleration.

During the travel of a vehicle, characteristic vibrations of the tires are caused by impacts from the road surface. For example, tire vibrations on a rough road, such as a drainage pavement or a snowy road, will be more marked than those on a flat road, such as a dry asphalt road. The peak position, namely, the peak frequency $f_p$ of such vibrations tends to be dependent on the slipperiness of the road surface. To be more specific, on a slippery road, such as a snowy road whose road surface friction coefficient μ lower than 0.3, the position of the peak frequency $f_p$ indicated by an arrow shifts toward lower frequencies as shown in FIG. 8. The reason is considered to be that the dynamic bond (spring constant) between the road surface and the tire tread becomes weaker on a slippery road surface.

It is to be noted that the peak frequency can be observed on flat (smooth) roads such as dry asphalt roads. However, the vibration level is lower than that when a vehicle is operated on drainage pavements or snowy roads. Therefore, when the vibration level $G_x(f_p)$ at peak frequency $f_p$ is lower than a predetermined threshold value K, the peak frequency extracting means 22 does not extract the peak frequency $f_p$ and sends a signal indicating the road surface being a flat road surface to the low μ road discriminating means 23.

The low μ road discriminating means 23 estimates a road surface condition under a traveling vehicle from the peak frequency $f_p$ and the wheel speed $V_w$, using the aforementioned frequency criterion formula shown by equation (2) below:

$$f_p = a \cdot V_w + b \quad (2)$$

Next, a description is given of a method for estimating a road surface condition using a road surface condition estimating apparatus 10F.

First an acceleration sensor 11 detects an unsprung fore-aft acceleration $G_x$, which is a fore-aft acceleration acting on the knuckle 31 and sends the data to a fluctuation range calculating means 14. At the same time, a wheel speed sensor 12 detects a wheel speed $V_w$ and sends the data to a wheel speed variation calculating means 13.

The wheel speed variation calculating means 13 calculates a variation $\Delta V_w$ in wheel speed, which is a variation in wheel speed $V_w$, and sends the data to the fluctuation range calculating means 14.

The fluctuation range calculating means 14 calculates a fluctuation range $\sigma(G_x)$ of unsprung fore-aft acceleration $G_x$ and a fluctuation range $\sigma(\Delta V_w)$ of the variation $\Delta V_w$ in wheel speed calculated by the wheel speed variation calculating means 13, respectively, and sends the data to a road surface condition estimating means 16.

The road surface condition estimating means 16 estimates a road surface condition under a traveling vehicle to be one of a flat road, a rough road, and an irregular road, using the fluctuation range $\sigma(G_x)$ of unsprung fore-aft acceleration and fluctuation range $\sigma(\Delta V_w)$ of variation in wheel speed, the maximum value $\sigma_{GM}$ of the fluctuation range of unsprung fore-aft acceleration and maximum value $\sigma_{VM}$ of the fluctuation range of variation in wheel speed, and the fluctuation range criterion formula representing a relationship between the fluctuation range $\sigma(\Delta V_w)$ of variation in wheel speed and the fluctuation range $\sigma(G_x)$ of unsprung fore-aft acceleration. More specifically, the estimation is done as follows:

A: $\sigma(\Delta V_w) > \sigma_{AM}$ or $\sigma(G_x) > \sigma_{GM}$: an irregular (ungraded) road B: $\sigma(G_x) > K \cdot \sigma(\Delta V_w) + \sigma(g)$: a rough road with some bumpiness C: $\sigma(G_x) \leq K \cdot \sigma(\Delta V_w) + \sigma(g)$: a flat (smooth) road When the road surface under a traveling vehicle is determined to be a rough road surface by the road surface condition estimating means 16, it is further estimated whether the rough road surface is a slippery road surface or not.

More specifically, the detected time-series waveform of unsprung fore-aft acceleration $G_x$ is subjected to a frequency analysis by the frequency analyzing means 21 to find a frequency spectrum of the unsprung fore-aft acceleration as shown in FIG. 8. And from this frequency spectrum, a peak frequency $f_p$, which is a frequency at the peak position within the band of 200 to 230 Hz, is extracted.

Then the road surface condition under a traveling vehicle is estimated, using the extracted peak frequency $f_p$, the wheel speed $V_w$ detected by the wheel speed sensor 12, and the frequency criterion formula (2):

$$f_p = a \cdot V_w + b \quad (2)$$

To be more specific, when $f_p > a \cdot V_w + b$, the road surface under a traveling vehicle is estimated to be a road surface whose road surface friction coefficient is high ($\mu > 0.7$), such as a drainage pavement. And when $f_p \leq a \cdot V_w + b$, the road surface under a traveling vehicle is estimated to be a road surface whose road surface friction coefficient is low ($\mu < 0.3$), such as a snowy road.

Therefore, when the road surface is a rough (bumpy) road surface, the road surface can be easily estimated to be a high μ road surface, such as a drainage pavement, or a slippery road surface, such as a snowy road.

Example 2

Figure 9:
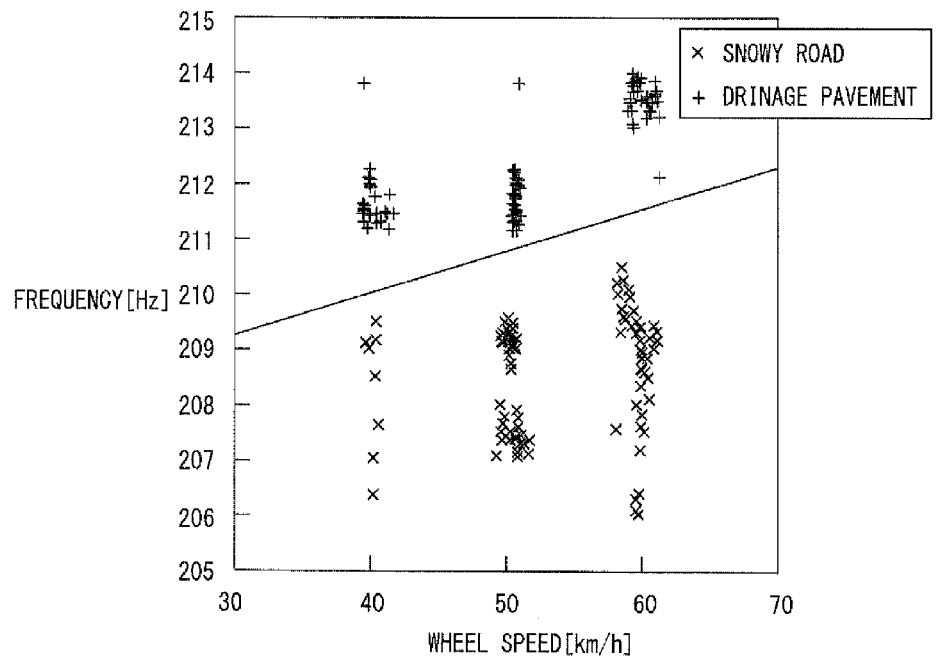
FIG. 9 is a diagram showing a relationship between the wheel speed and the peak frequency.

A vehicle having an acceleration sensor attached to the knuckle of the left front wheel was operated at predetermined speeds (40 km/h, 50 km/h, and 60 km/h) on a drainage pavement and a snowy road. And a frequency spectrum was calculated for every 6.5 meters of vehicular run, and the frequency spectra of the latest five consecutive runs were averaged. Then the peak frequency $f_p$ in the band of 200 to 230 Hz of this frequency spectrum was extracted, and the relationship between the wheel speed $V_w$ and the peak frequency $f_p$ was found. The results are shown in FIG. 9. The tires used was studless tires of 225/55R17 size.

Also, the information on the speed of left wheels was acquired from a vehicle information system (line of CAN).

In FIG. 9, the horizontal axis of the diagram represents the wheel speed, and the vertical axis the frequency. The "+" marks (crosses) stand for the data on the drainage pavement, and the "x" marks the data on the snowy road.

As is clear from the diagram, the data on the snowy road, which is a slippery road with a low road surface friction coefficient, are distributed mostly below the frequency criterion formula shown in a straight line, whereas the data on the drainage pavement with a high road surface friction coefficient are distributed mostly above it. It has been confirmed therefore that by finding the relationship between the wheel speed $V_w$ and the peak frequency $f_p$, it is possible to reliably estimate whether the road surface under a traveling vehicle is in a slippery condition or not.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS 10 road surface condition estimating apparatus
11 acceleration sensor
11Y second acceleration sensor
12 wheel speed sensor
13 wheel speed variation calculating means
14 fluctuation range calculating means
15 storage means
16 road surface condition estimating means
17 unsprung lateral acceleration fluctuation range calculating means
18, 18P flat road discriminating means
19 acceleration product calculating means
21 frequency analyzing means
22 peak frequency extracting means
23 low μ road discriminating means
30 wheel unit
31 knuckle
32 wheel
33 wheel hub
34 shock absorber
T tire

The invention claimed is:
1. A method for estimating a road surface condition, comprising the steps of:

detecting an unsprung fore-aft acceleration by an acceleration sensor attached to an unsprung position of a vehicle;

detecting a wheel speed;

calculating a variation in the detected wheel speed;

calculating a fluctuation range of the calculated variation in wheel speed and a fluctuation range of the detected unsprung fore-aft acceleration; and estimating a road surface condition from a relationship between the fluctuation range of the variation in wheel speed and the fluctuation range of the unsprung fore-aft acceleration.

2. The method for estimating a road surface condition according to claim 1, wherein, in the step of estimating a road surface condition, the road surface under a traveling vehicle is estimated to be a flat road surface when the calculated fluctuation range of the unsprung fore-aft acceleration is equal to or smaller than the calculated value of the fluctuation range of the unsprung fore-aft acceleration obtained by substituting the fluctuation range of the variation in wheel speed into a fluctuation range criterion formula representing a predetermined relationship between the fluctuation range of unsprung fore-aft acceleration and the fluctuation range of variation in wheel speed.

3. The method for estimating a road surface condition according to claim 2, further comprising the steps of:

detecting an unsprung lateral acceleration, in addition to the unsprung fore-aft acceleration;

calculating a fluctuation range of the unsprung lateral acceleration; and determining whether the estimated flat road surface is a dry paved road surface or not from a relationship between the calculated fluctuation range of the unsprung lateral acceleration and the fluctuation range of the unsprung fore-aft acceleration.

4. The method for estimating a road surface condition according to claim 2, further comprising the steps of:

detecting an unsprung lateral acceleration, in addition to the unsprung fore-aft acceleration;

calculating an absolute value of the product of the unsprung fore-aft acceleration and the unsprung lateral acceleration and a product of the absolute value of the unsprung fore-aft acceleration and the absolute value of the unsprung lateral acceleration; and determining whether the estimated flat road surface is a dry paved road surface or not from a relationship between the calculated absolute value of the product of the unsprung fore-aft acceleration and the unsprung lateral acceleration and the calculated product of the absolute value of the unsprung fore-aft acceleration and the absolute value of the unsprung lateral acceleration.

5. The method for estimating a road surface condition according to claim 1, wherein, in the step of estimating a road surface condition, the road surface under a traveling vehicle is estimated to be an irregular road surface when the fluctuation range of the variation in wheel speed exceeds a predetermined maximum fluctuation range of variation in wheel speed or when the calculated fluctuation range of the unsprung fore-aft acceleration exceeds a predetermined maximum fluctuation range of acceleration.

6. The method for estimating a road surface condition according to claim 1, wherein the step of estimating a road surface condition further includes the steps of:

estimating whether the road surface under a traveling vehicle is a rough road surface or not from a relationship between the fluctuation range of the variation in wheel speed and the fluctuation range of the unsprung fore-aft acceleration; and calculating, when the estimated road surface is a rough road surface, a peak frequency at a peak position within a band of 200 to 230 Hz of a frequency spectrum obtained by a frequency analysis of the detected unsprung fore-aft acceleration and estimating whether the rough road surface is a slippery road surface or not from the peak frequency and the wheel speed, wherein in the step of estimating whether the road surface under a traveling vehicle is a rough road surface or not, the road surface under a traveling vehicle is estimated to be a rough road surface when the calculated fluctuation range of the unsprung fore-aft acceleration is greater than the calculated value of the fluctuation range of the unsprung fore-aft acceleration obtained by substituting the fluctuation range of the variation in wheel speed into a predetermined fluctuation range criterion formula representing a relationship between the fluctuation range of unsprung fore-aft acceleration and the fluctuation range of variation in wheel speed, and wherein in the step of estimating whether the rough road surface is a slippery road surface or not, the rough road surface is estimated to be a slippery road surface whose road surface friction coefficient $\mu$ is lower than 0.3 when the detected peak frequency is lower than the calculated value of peak frequency obtained by substituting the detected wheel speed into a frequency criterion formula representing a predetermined relationship between peak frequency and wheel speed.

7. The method for estimating a road surface condition according to claim 6, wherein in the step of estimating whether the road surface under a traveling vehicle is a rough road surface or not, the road surface under a traveling vehicle is estimated to be an irregular road surface when the calculated fluctuation range of the variation in wheel speed exceeds a predetermined maximum fluctuation range of variation in wheel speed or when the fluctuation range of the unsprung fore-aft acceleration exceeds a predetermined maximum fluctuation range of acceleration.

8. A road surface condition estimating apparatus comprising:

an unsprung fore-aft acceleration detecting means disposed at an unsprung position of a vehicle to detect an unsprung fore-aft acceleration;

a wheel speed detecting means for detecting a wheel speed;

a wheel speed variation calculating means for calculating a variation in the detected wheel speed;

a fluctuation range calculating means for calculating a fluctuation range of the variation in wheel speed and a fluctuation range of the unsprung fore-aft acceleration;

a storage means for storing a fluctuation range criterion formula representing a predetermined relationship between the fluctuation range of variation in wheel speed and the fluctuation range of unsprung fore-aft acceleration; and a road surface condition estimating means for estimating a road surface condition under a traveling vehicle, using the calculated fluctuation range of the variation in wheel speed and fluctuation range of the unsprung fore-aft acceleration and the fluctuation range criterion formula.

9. The road surface condition estimating apparatus according to claim 8, further comprising:

an unsprung lateral acceleration detecting means disposed at an unsprung position of a vehicle to detect an unsprung lateral acceleration; and an unsprung lateral acceleration fluctuation range calculating means for calculating a fluctuation range of the detected unsprung lateral acceleration, wherein the road surface condition estimating means determines whether the estimated road surface is a dry paved road or not from a relationship between the calculated fluctuation range of the unsprung lateral acceleration and fluctuation range of the unsprung fore-aft acceleration.

10. The road surface condition estimating apparatus according to claim 8, further comprising:

an unsprung lateral acceleration detecting means disposed at an unsprung position of a vehicle to detect an unsprung lateral acceleration; and an acceleration product calculating means for calculating an absolute value of the product of the unsprung fore-aft acceleration and the unsprung lateral acceleration and a product of an absolute value of the unsprung fore-aft acceleration and an absolute value of the unsprung lateral acceleration, wherein the road surface condition estimating means determines whether the estimated road surface is a dry paved road or not from a relationship between the absolute value of the product of the unsprung fore-aft acceleration and the unsprung lateral acceleration and the product of the absolute value of the unsprung fore-aft acceleration and the absolute value of the unsprung lateral acceleration.

11. The road surface condition estimating apparatus according to claim 8, further comprising:

a frequency analyzing means for performing a frequency analysis on the detected unsprung fore-aft acceleration; and a peak frequency calculating means for calculating a peak frequency at a peak position within a band of 200 to 230 Hz of a frequency spectrum obtained by the frequency analysis, wherein the storage means stores a predetermined maximum fluctuation range of wheel speed, a predetermined maximum fluctuation range of unsprung fore-aft acceleration, and a fluctuation range criterion formula representing a relationship between the fluctuation range of unsprung fore-aft acceleration and the fluctuation range of variation in wheel speed, and wherein the road surface condition estimating means determines the road surface to be a rough road surface when the calculated fluctuation range of the unsprung fore-aft acceleration is greater than the calculated value of the fluctuation range of unsprung fore-aft acceleration obtained by substituting the fluctuation range of the variation in wheel speed into the fluctuation range criterion formula and, in addition, when the fluctuation range of the variation in wheel speed and the fluctuation range of the unsprung fore-aft acceleration are smaller than the maximum fluctuation range of variation in wheel speed and the maximum fluctuation range of unsprung fore-aft acceleration, respectively, and wherein, when the determined road surface is a rough road surface, the road surface condition estimating means estimates the rough road surface to be a slippery road surface whose road surface friction coefficient $\mu$ is lower than 0.3, when the detected peak frequency is lower than the calculated value of peak frequency obtained by substituting the detected wheel speed into a frequency criterion formula representing a predetermined relationship between peak frequency and wheel speed.

* * * * *